Patented Aug. 5, 1952

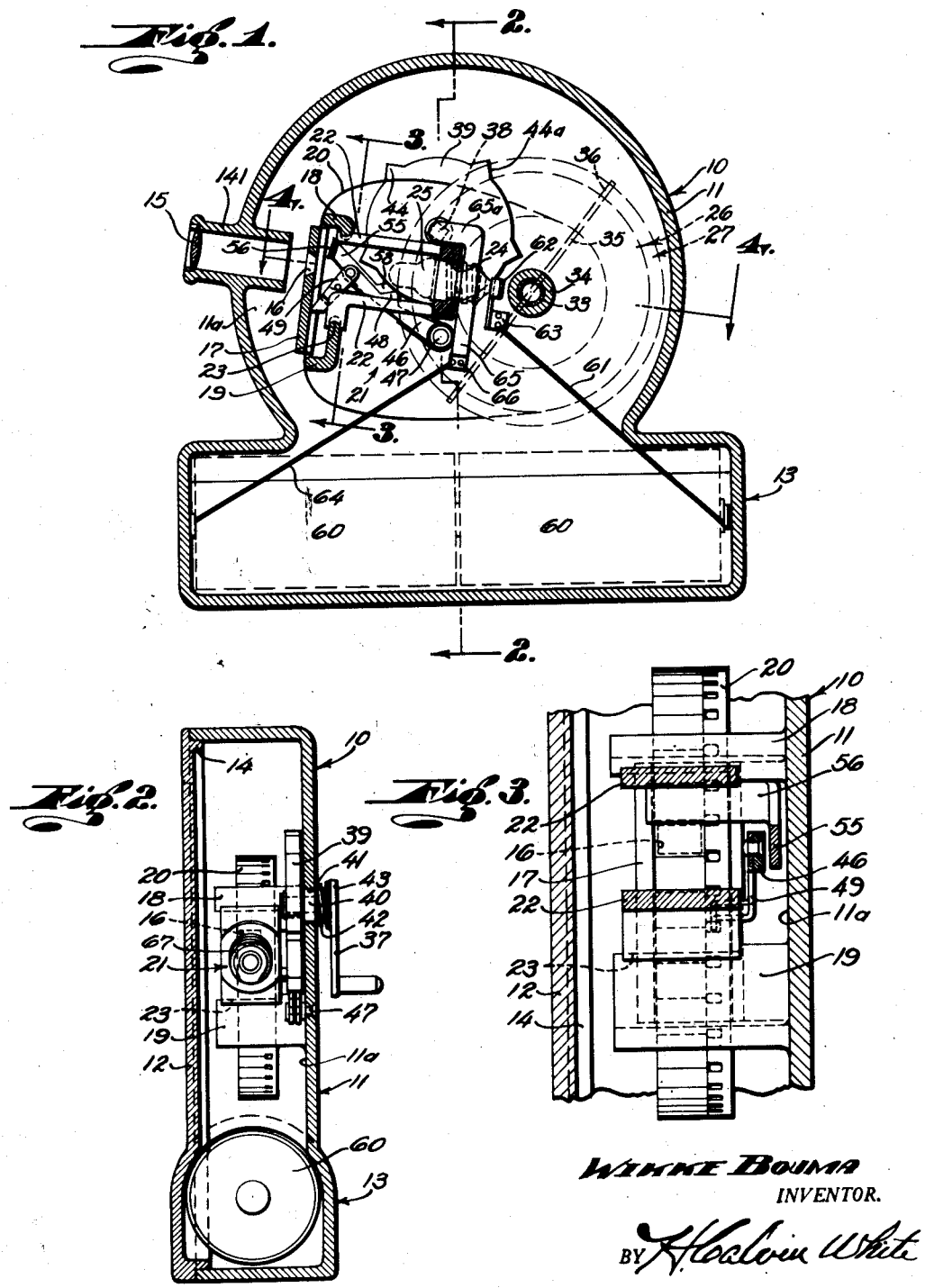

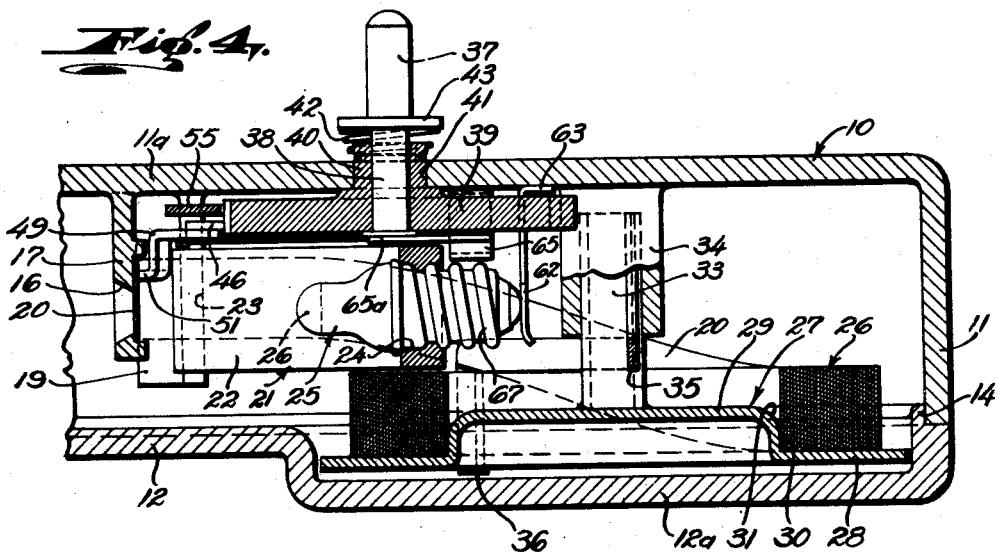
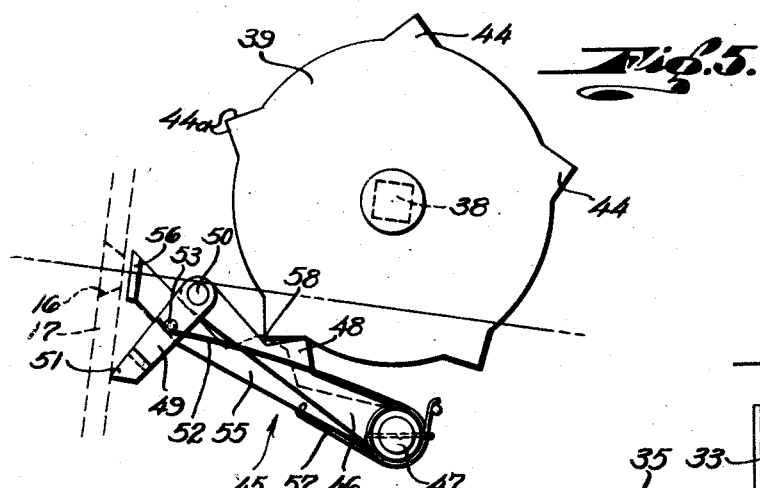
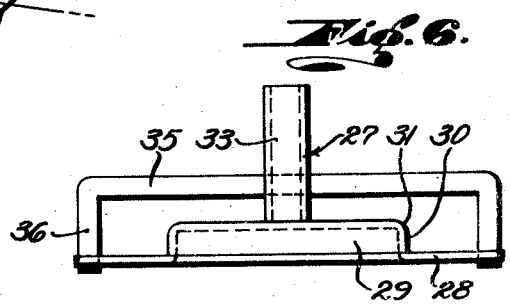
WIKKE BOUMA
INVENTOR.
ATTORNEY

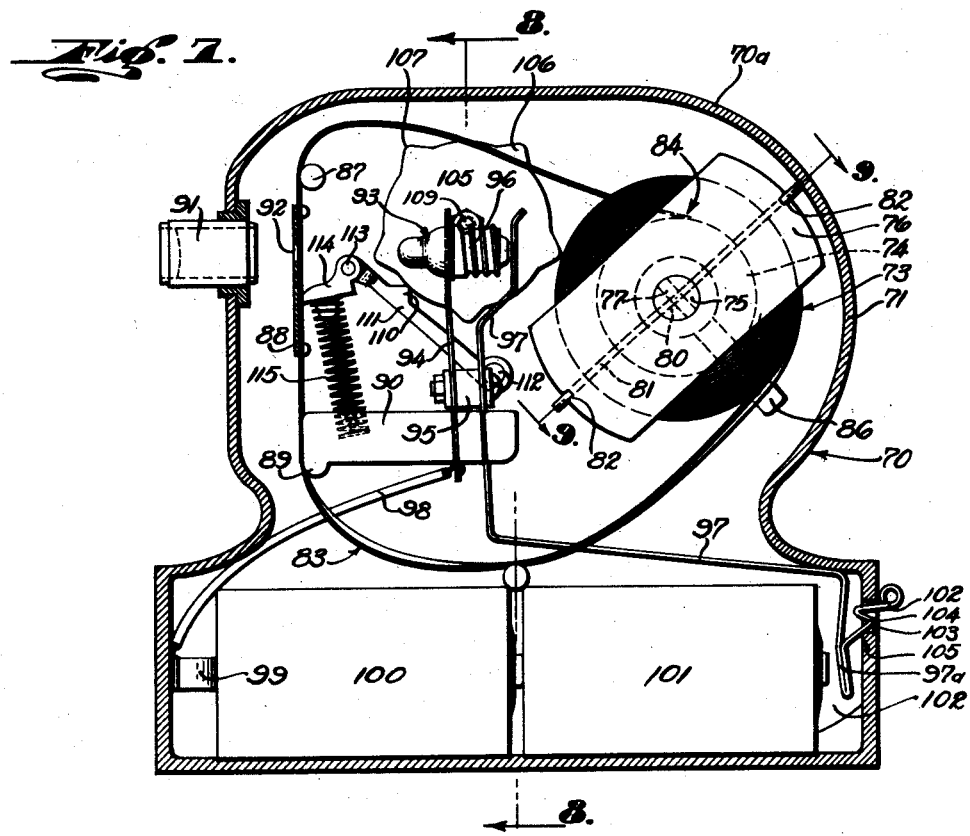
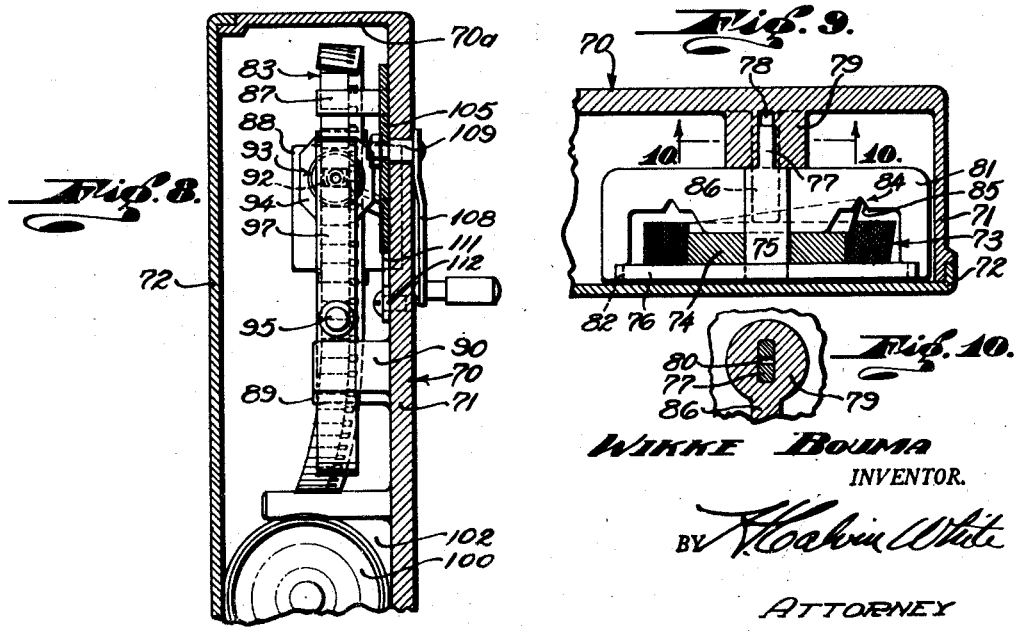

2,605,674

UNITED STATES PATENT OFFICE 2,605,674

TOY MOTION-PICTURE PROJECTOR

Wikke Bouma, Glendale, Calif.

Application September 24, 1946, Serial No. 698,962

4 Claims. (Cl. 88—18.7)

This invention has to do with improvements in motion picture film projectors or viewers of a type and size adaptable for low cost manufacture and sale as miniature or toy film projecting devices. Particularly the invention is concerned with this type of projector containing the film in endless and therefore continuously displayable form, and by which the projected or direct film image is illuminated.

My general object is to provide for the incorporation in a practical and simplified assembly, of an endless film roll, a light source for illuminating a portion of the film being taken from and returned to the roll, and a film advancing mechanism characterized by its simple practicability for use in a low cost device, and capacity for imparting positive and intermittently arcuate movement to the film.

The invention further contemplates the provision in a unitary housing or case containing the stated assembly, of one or more batteries for supplying current to a film illuminating lamp, and a switch control, which may be adapted as hereinafter described, to assure against inadvertent consumption of the battery energy.

Additional objects have to do with features such as an improved film movement capable of actuation to the same effect on the film, by rotation of an operating handle in reverse directions; improved film guide and operation plate arrangements; and the manner of accommodating the entire assembly in a housing, the interior of which and all contained parts are directly accessible by removal of a cover section of the housing.

All the above mentioned and additional features and objects of the invention will be explained and understood to better advantage from the following detailed description of typical and illustrative embodiments shown by the accompanying drawings, in which:

Fig. 1 is a cross-sectional view of the projector;

Fig. 2 is a vertical section taken on line 2—2 of Fig. 1;

Fig. 3 is an enlarged fragmentary section on line 3—3 of Fig. 1;

Fig. 4 is an enlarged cross-section on line 4—4 of Fig. 1;

Fig. 5 is an enlarged inside view of the film drive and shutter mechanism;

Fig. 6 is an elevational view showing the film reel and keeper removed from the housing;

Fig. 7 is a view similar to Fig. 1 showing a variational embodiment of the invention;

Fig. 8 is a fragmentary cross-section on line 8—8 of Fig. 7;

Fig. 9 is a cross-section on line 9—9 of Fig. 7; and

Fig. 10 is a cross-section on line 10—10 of Fig. 9.

The projector comprises a case or housing 10 conveniently shaped to accommodate the endless film, the film holding mechanism, light source and current supply, and preferably is made to include body and cover sections 11 and 12 of circularly curved shape above an extended base 13, as shown in Fig. 1. The housing sections 11 and 12 are frictionally interengaged, as by the reception of the continuous cover flange 14 in snug engagement within the body section. It may be mentioned that the housing and its hereinafter described integral parts, may be conveniently cast using any of the appropriate organic plastics.

The peripheral wall of the body section 11 is formed to contain a light passing tube 141 within which is placed a plastic or other lens 15, the tube being in axial alinement with the later described light source and opening 16 in the aperture plate 17 projecting inwardly from the flat side wall 11a of the body. Angular supports 18 and 19, also integral with and projecting from the housing wall 11a, are positioned at the immediate inside of the aperture plate 17 to guide the film 20, the latter passing about the rounded edges of the guides, and across and in flat surface engagement with the aperture plate. As illustrated, the guides and aperture plate are in such proximity as to frictionally restrain the film between its intermittent advancements. Posts 18 and 19 also serve as supports for the incandescent lamp holder generally indicated at 21, the latter comprising a U-shaped removable unit, the arms 22 of which are recessed at 23 to fit and be received between the curved inner edges of the supporting posts. The carrier 21 has a threaded opening 24 into which is screwed the small lamp 25 of the type having a condensing lens 26 through which the projected light is concentrated on the aperture 16. As will be understood, the carrier 21 may be removed from between the posts 18 and 19 for replacement of burned-out lamps.

The film 20 is wound in an endless convolute roll 26 carried on a reel 27 received within the recessed portion of the cover section in offset relation to the line of light projection from the lamp through the film aperture. The reel 27 may be formed as a single piece shaped to have the dual functions of a carrier for the convolute film roll 26, and a guide for the portion of the film leaving the roll. Accordingly, the reel has an outer annular flange portion 28, and a central portion 29 offset inwardly within the film roll, to present a surface 30 about which the film is wound, and an angular or curved surface 31 which engages and smoothly guides the film as it is taken from the roll. As illustrated in Figs. 1 and 4, the film passes upwardly from the inside of the film roll, thence downwardly between aperture plate 17, and guides 18 and 19, to be returned to and rewound about the outside of the roll. Thus as the film is advanced by the later described drive, it becomes self-winding and releasing with relation to the film roll. The reel 27 is suitably mounted for rotation within the case, as by reception of its shaft 33 within a tubular bearing 34 cast integrally with the housing section 11a. As best illustrated in Fig. 6, the shaft 33 is slotted to receive a film keeper 35 which diametrically overlies the roll 26 and has its ends 36 received within openings in the reel flange 28.

The film drive is operated by an outside crank handle 37 having a square cross-section spindle 38 received within a correspondingly shaped opening in a cam wheel 39, the hub 40 of which may be journaled within opening 41 in the wall of the housing. The spindle thus rotates the cam wheel, while having capacity for relative axial movement which, inwardly, is resisted by coil spring 42 confined between the cam wheel and the handle flange 43. Referring to Fig. 5, wheel 39 carries a suitable number of equally spaced cams 44, preferably formed as peripheral teeth, the side surfaces 44a of which extend symmetrically with relation to the wheel radii at substantially the angularity shown.

The film drive, generally indicated at 45, comprises an arm 46 having a pivotal support 47 on the housing wall, the arm carrying an intermediate projection 48 corresponding in angularity to the tooth-shaped cams 44, engageable by the latter upon rotation of the wheel 39 to intermittently and reciprocally deflect the arm. In this connection it is to be observed that the arm is given the same film advancing deflection regardless of the direction of rotation of the cam wheel 39. A pawl 49 pivoted at 50 on the free end of arm 46, has a pointed end 51 engageable within the film perforations, the pawl being thrust against the film by spring 52 bearing against the pawl carried projection 53 so that the tendency of the spring is both to urge the pawl against the film and resist downward displacement of the pawl and arm assembly. Upon rotation of the wheel 39, the interengagement of the cams 44 and 48 displaces the pawl to advance the film a distance corresponding to the dimensions of successive frames.

Optionally the film movement may have an associated shutter device, typically in the form of an arm 55 pivotally carried on pin 47 and having a terminal shutter flange 56 adapted to be swung into and out of overlying relation to the aperture 16. Downward displacement of the shutter arm is resisted by spring 57. Arm 55 carries a cam projection 58 in such staggered or off-set relation to the cam 48 on the pawl arm 46, that the shutter flange 56 will be swung into the light path through aperture 16, before the pawl 49 carried by arm 46 starts its intermittent advancements of the film.

Current is supplied to the lamp 25 from batteries 60 contained in the base compartment 13 of the housing. One of the battery terminal conductors 61 is attached to a flexible terminal 62 secured at 63 to the inside of the housing and engaged by the contact end of the lamp in the relations shown in Figs. 1 and 4. A second conductor 64 leads from the battery case to a flexible switch element 65 attached at 66 to the housing and having an angular end portion 65a positioned for engagement by the end of the shaft spindle 38, see Fig. 4, to thrust the element against the metallic lamp threads 67.

Considering the operation of the mechanism as a projector, the film 20 first is threaded between the aperture plate and guide posts as illustrated, and the cover section 12 receiving the reel and endless film roll, is applied to the body portion of the housing. Being dependent for illumination upon closing deflection of the switch element 65 against its threads 67, the lamp 25 is energized only by or during operation of the handle 37. Thus, simultaneously with its rotation, the handle is thrust inwardly to deflect the switch element against, and therefore illuminate the lamp. Then upon rotation of the handle and cam wheel 39 in either direction, pawl 49 is actuated to intermittently advance the film, drawing it from the inside of the roll 26 and returning the film for rewinding on the outside of the roll. Thus the film may be given continuous and indefinite showing, with assured proper advancement of the film in whichever direction the handle may be rotated.

Relative to the described light switch, it is considered advantageous to control the switch, as by the film drive handle and in the manner explained, to prevent inadvertent burning of the lamp and consumption of battery current when the device is not in operation. It is to be understood, however, that such other appropriate or independent switch control for the battery circuit may be used as desired.

The variational form of the invention shown in Fig. 7 is generally similar in its construction and mode of operation to the described embodiment, but differs with respect to various details and the more distended form of the case or housing, and the spaced arrangement of its contained mechanisms. Here the housing 70 is shown to have uniform thickness and to include the body section 71 and its cover 72, the top portion 70a of the housing being extended beyond the circular form of Fig. 1 to accommodate the illustrated arrangement and spaced relation of the film reel, film movement, light source and projection lens.

The convolute film roll 73 is carried about a reel or wheel 74 rotatable about shaft 75 integral with disc 76 exteriorly confining the film and its reel. The shaft 75 has a non-circular end projection 77 received within opening 78 in the housing boss 79, projection 77 and the shaft 75 being longitudinally slotted at 80, see Fig. 10, to receive the U-shaped film and reel keeper 81. Reception of the keeper within slot 80 expands the projection 77 into tight or snug engagement within the opening 78. The disc 76 is slotted at 82 to receive and frictionally engage the keeper 81.

The film loop 83 is payed out at 84 from the center of the roll 73, the film being accommodated within guide notch 85 in the keeper. At its inside the film roll is confined on its reel 74 by engagement with a guide 86 projecting inwardly from the wall of the housing to engage the edge of the roll. Leaving the roll, the film passes about the guide post 87, against and across the aperture plate 88, and about the curved guide end 89 of the stationary housing projection 90, the film thence being returned to the outside of the roll 73. As before, the projection lens tube 91 is contained within the wall of the housing in axial alignment with the light-passing aperture 92.

The light source consists of a condensing type lamp 93, for example a 2.4 volt lamp supported in axial aligment with the aperture 92 by reception of the bulb end of the lamp within an opening in a resilient metallic conductor 94 carried within a slot in the projection 90. As will be understood, the support 94 engages the metallic jacket 96 of the lamp. The inner contact end of the lamp is engaged and supported by a second resilient conductor 97 carried by projection 90 secured by clamp 95 to conductor 94 so that the lamp is confined between the conductors and maintained in a position of stationary alignment with the light aperture axis.

Element 94 is connected by conductor 98 with a leaf spring type terminal 99 engaging one of the flashlight type batteries 100 and 101 contained within the base compartment 102 of the housing. Element 97 has an extended portion 97a serving as a switch for engagement with the terminal of battery 101. Portion 97a normally is disengaged by pulling its bent terminal 102 outwardly through the case opening 103. When contact is to be made between portion 97a and the battery terminal, the bend 104 is thrust downwardly into the notch 105.

The film movement, similar to the first described form, comprises wheel 105 having the equally spaced and symmetrical cam projections 106, the points 107 of which are curved substantially as illustrated. The wheel is rotated by handle 108, see Fig. 8, carried on shaft 109 extending through the housing wall. The cams 106 are engageable, upon rotation of the wheel in either direction, with projection 110 on arm 111 pivoted to the housing wall at 112. Pivoted at 113 to the outer end of the arm is the film perforation engaging claw 114 which bears against coil spring 115 supported by the projection 90. Thus as the arm carried projection 110 is engaged by the successive cams 106, the claw 114 is given corresponding successive downward film advancing movements, after each of which the claw and arm assembly are returned by spring 115 to the positions illustrated.

During operation of the film movement, the film is continuously moved through its loop formation across the path of light being projected from the lamp through the aperture plate and projection lens. Simultaneously the film is taken from and rewound on the convolute loop, all in a manner such that the film is given smoothly moving and regularized intermittent advancements, continuously so long as the device may be operated.

I claim:

1. A device of the character described comprising a housing containing a light passing opening and having body and cover sections, an endless film wound in a convolute roll within the housing, a lamp positioned in the housing in laterally offset relation to said roll, an aperture plate and stationary guide members carried by the body section and confining a portion of the film for movement from the inside of said roll across the light path between said lamp and opening, a rotatable handle at the outside of said body section, a rotatable cam connected to said handle, a reciprocally swinging arm pivotable about a fixed axis and actuated by said cam, a pawl carried by the arm and engageable within the film perforations to intermittently advance the film from said roll across said light path and to cause the film to rewind on the roll, and a shutter element pivotable about the same axis as said arm and operated by said cam wheel to intermittently traverse said light path.

2. A device of the character described comprising a housing contaiinng a light passing opening and having body and cover sections, an endless film wound in a convolute roll within the housing, means carried by said body section for supporting the film roll, a lamp positioned in the housing in laterally offset relation to said roll, an aperture plate and stationary guide members carried by the body section and confining a portion of the film for movement from the inside of said roll across the light path between said lamp and opening, a rotatable handle at the outside of said body section, a wheel connected to said handle and having spaced peripheral cams, a reciprocally swinging arm carrying a cam projection engageable by the successive wheel cams, a pawl pivotally carried by said arm, said pawl being engageable within the film perforations to intermittently advance the film from said roll across said light path and to cause the film to rewind on the roll, and a single yielding element operating both to resist cammed displacement of said pawl and arm to urge said pawl against said film.

3. A device of the character described comprising a housing containing a light passing opening, an endless film wound in a convolute roll within the housing, a lamp within the housing, means confining a portion of the film for movement across the light path between said lamp and opening, a rotatable film operating handle, a rotatable cam connected to said handle, a reciprocally swinging arm actuated by said cam, a pawl carried by and movable relative to the arm and engageable within the film perforations to intermittently advance the film from said roll across said light path and to cause the film to rewind on the roll, and a single yielding element operating both to resist cammed displacement of said pawl and arm and to urge said pawl against said film.

4. A device of the character described comprising a housing containing a light passing opening and having body and cover sections, an endless film wound in a convolute roll within the housing, a lamp positioned in the housing in laterally offset relation to said roll, an aperture plate and stationary guide members carried by the body section and confining a portion of the film for movement from the inside of said roll across the light path between said lamp and opening, a rotatable handle at the outside of said body section, a rotatable wheel connected to said handle and having spaced peripheral cams, a reciprocally swinging arm engageable by the successive wheel cams as each cam reaches a predetermined location upon rotation of said wheel, a pawl pivotally carried by said arm and engageable within the film perforations to intermittently advance the film from said roll across said light path and to cause the film to rewind on the roll, and a shutter element having a portion adjacent said arm adapted to be engaged by each cam immediately prior to and during engagement of said arm by the same cam and operable upon such engagement to intermittently traverse said light path.

WIKKE BOUMA.

(References on following page)

REFERENCES CITED

The following references are of record in the file of this patent:

UNITED STATES PATENTS

| Number | Name | Date |
|---|---|---|
| 1,295,653 | Wells | Feb. 25, 1919 |
| 1,624,103 | Knopp | Apr. 12, 1927 |
| 1,876,845 | Bowen | Sept. 13, 1932 |
| 2,100,008 | Stephens | Nov. 23, 1937 |
| 2,122,804 | Tichenor | July 5, 1938 |
| 2,152,624 | Cazes | Apr. 4, 1939 |
| 2,168,043 | O'Grady | Aug. 1, 1939 |
| 2,178,243 | Sachtleben | Oct. 31, 1939 |
| 2,223,848 | Falkenhagen | Dec. 3, 1940 |
| 2,311,204 | Bouma | Feb. 16, 1943 |

FOREIGN PATENTS

| Number | Country | Date |
|---|---|---|
| 6,846 | Great Britain | of 1907 |
| 99,394 | Austria | Mar. 10, 1925 |
| 428,163 | Germany | Apr. 24, 1926 |
| 253,994 | Great Britain | June 24, 1926 |
| 422,588 | Great Britain | Jan. 15, 1935 |